United States Patent [19]
Douglas

[11] Patent Number: 5,946,502
[45] Date of Patent: Aug. 31, 1999

[54] PHOTOGRAPHIC APPARATUS

[75] Inventor: Lawrence M. Douglas, So. Easton, Mass.

[73] Assignee: Polaroid Corporation, Cambridge, Mass.

[21] Appl. No.: 09/133,662

[22] Filed: Aug. 12, 1998

Related U.S. Application Data

[60] Provisional application No. 60/055,661, Aug. 13, 1997.

[51] Int. Cl.⁶ .................................................. G03B 17/24
[52] U.S. Cl. .......................... 396/30; 396/348; 396/351; 396/535
[58] Field of Search ................................ 396/30–41, 351, 396/535, 348

[56] References Cited

U.S. PATENT DOCUMENTS

| | | | |
|---|---|---|---|
| 2,834,269 | 5/1958 | Land | 396/351 |
| 3,791,274 | 2/1974 | Hansen | 396/351 |
| 4,154,518 | 5/1979 | Ito et al. | 396/351 |
| 4,166,683 | 9/1979 | Ito et al. | 354/192 |
| 4,226,515 | 10/1980 | Plummer | 354/21 |

FOREIGN PATENT DOCUMENTS

| | | | |
|---|---|---|---|
| 0.763.769.A1 | 9/1995 | European Pat. Off. | G03B 17/52 |
| 1.582.202 | 7/1968 | France . | |
| WO 97/36207 | 3/1997 | WIPO | G03B 17/52 |

OTHER PUBLICATIONS

PCT International Search Report, mailed Dec. 3, 1998. PCT/US 98/ 16740.

*Primary Examiner*—David M. Gray
*Attorney, Agent, or Firm*—Leslie Payne

[57] ABSTRACT

A self-developing camera is disclosed which comprises a housing assembly including a film exit opening. Provision is made for an objective lens assembly mounted on the housing assembly and which defines an optical axis for optically capturing images of a scene and directing the images to a focal plane. A mirror in the housing assembly redirects the scene light from the objective lens assembly to a film unit of the self-developing type adjacent the focal plane. The mirror is in an operative orientation generally below the optical axis when the camera is held in a generally horizontal image capture mode.

11 Claims, 12 Drawing Sheets

PHOTOGRAPHIC APPARATUS

CROSS-REFERENCE TO RELATED APPLICATIONS

This application is related to copending U.S. patent application Ser. No. 08/826,237, filed Mar. 27, 1997 and claims the benefit of provisional patent application 60/055,661 filed Aug. 13, 1997.

FIELD OF THE INVENTION

In general, the present invention relates to a single-use camera, and more particularly, to a novel preloaded single-use instant camera, as well as user operated manual means for sequentially withdrawing preloaded pressure-processable film units, the withdrawal effecting the processing of said units. The camera is also of the folding type.

BACKGROUND OF THE INVENTION

For reasons of economy and convenience, so-called single use, disposable, or throwaway photographic cameras have gained widespread popularity in recent years. See e.g., U.S. Pat. Nos. 5,361,111; 5,339,127; 5,235,364; 4,954,857; 4,855,774; 4,833,495; 4,831,398; 4,884,087; and, 4,751,536. Such cameras which are essentially film cassettes provided with inexpensive, unembellished and/or spartan film exposure and advancing mechanisms—contain a conventional photographic film cartridge, preloaded with standard 35 mm photographic film, and ready for exposure. Following film exposure, the single-use camera is given to a photofinisher who tears and/or breaks open the camera housing, and removes the film cartridge. The film cartridge is then broke open and the exposed filmstrip withdrawn for processing.

While single-use cameras preloaded with standard 35 mm film are—perhaps, on account of their current commercial prominence—readily available and convenient, until the return of the finished prints, the photographer can neither view a captured image, nor ascertain the failure to do so. The photographer must wait.

Self-developing type cameras employing self-developing film have enjoyed widespread commercial success because they allow the user to obtain the instant results of their photographic efforts. While generally dedicated for repeated use, there are continuing efforts to provide the expedience and other numerous benefits of self-developing film in a single-use camera. See, e.g., U.S. Pat. No. 4,962,398, issued to J. D. Sorg et al. on Oct. 9, 1990, and U.S. Pat. No. 4,518,235, issued to R. K. Reed et al. on May 21, 1985. Reference is also made to commonly assigned U.S. Pat. No. 5,453,804, issued to James M. Cloherty and Philip R. Norris on Sep. 26, 1995; commonly assigned U.S. Pat. No. 5,103,249, issued to Lauren Keene on Apr. 7, 1992; commonly assigned U.S. Pat. No. 3,672,275, issued to Bruce K. Johnson on Jun. 27, 1972; commonly assigned U.S. Pat. No. 2,930,301, issued to Edwin H. Land and Vaito K. Eloranta on Mar. 29, 1960, and commonly assigned U.S. patent application Ser. No. 08/549,654, filed by Philip R. Norris and Kenneth C. Waterman on Oct. 27, 1995.

In addition folding cameras are well-known including cameras of the self-developing type. Such cameras, however, usually employ a mirror which is movable between collapsed and erect conditions, but in addition usually have other elements of the optical system move therewith; such as Polaroid's SX-70 camera and others including U.S. Pat. No. 5,027,142.

SUMMARY OF THE INVENTION

According to the present invention, provision is made for a foldable camera; especially of the self-developing type wherein the only movable component of the camera's optical system is the mirror; particularly with the taking lens and film box in the same housing. In addition there is provision of having such an optical system including mirror deployable on the bottom side of the camera. The present invention is not limited to folding only the mirror from the bottom of the camera, but encompasses folding other components of the optical system from other than the so-called top portion of the camera. In addition, it is desirable to have such an optical system extend or be an extension of the bottom or side of the camera in a fixed or non-folding condition. The present invention also envisions using all of the above in conventional cameras as well as single-use cameras of the type defined herein.

It is another object of the present invention to provide a single-use instant cameras preloaded with presently available instant film units (with little or no modifications), such as, Polaroid Captiva film. Polaroid Spectra HighDefinition film, and Polaroid Type 600 HighDefinition film, as well as, Fuji FI-10, FI-800, FI-800G, and FI800GT integral print films, and Fuji FP-100 peelapart print film.

It is another object of the invention to provide a single-use instant camera having a high degree of reliability in the hands of users having a little knowledge of photography and which is inexpensive to produce and therefor inexpensive to the public.

For certain pressure-processable film products, particularly those dependent on the rupturing of a developer containing pod and the subsequent spreading of the contents thereof, conformity with comparatively precise physical parameters is required to accomplish desirable development. However, the influence of user variability militates against the precise operation of manually-driven mechanisms. Accordingly, it is another object of the present invention to provide an inexpensive single-use camera having mechanical apparatus designed to accommodate or otherwise mitigate the impact of user variability.

Aside from its use in a preloaded single-use instant camera, other applications for the manual processing means are possible. Accordingly, it is a further object of the present invention to provide an imaging apparatus having user operated means for selecting, introducing, and advancing an unprocessed pressure-processable film unit into a nip extant between pressure-effecting members, the otherwise inaccessibly-held film unit being advanced at least partially out of said apparatus.

For further understanding of the nature and objects of the invention, reference should be had to the following description considered in conjunction with the accompanying drawings.

BRIEF DESCRIPTION OF THE DRAWINGS

Each of FIGS. 1 to 12 provide schematic representational illustrations. The relative locations, shapes, and sizes of objects have been exaggerated to facilitate discussion and presentation herein.

DETAILED DESCRIPTION OF THE OF THE INVENTIVE SUBJECT MATTER

Figure 1:
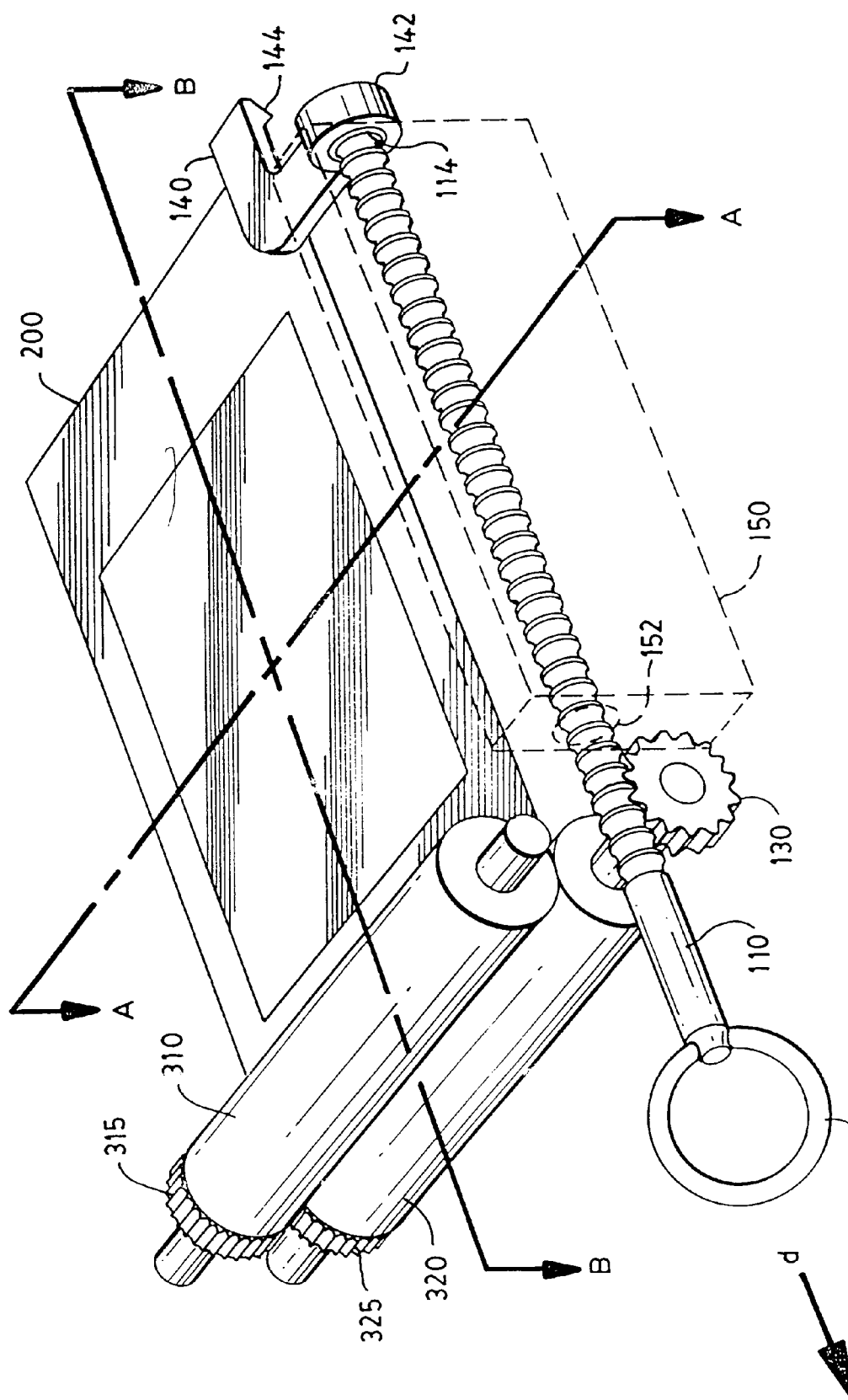
FIG. 1 is a perspective view illustrating an arrangement useful for mechanically withdrawing a pressure-processable film unit from a preloaded single-use instant camera according to an embodiment of the present invention.

The present invention is concerned principally with the construction of a novel photographic product in the form of a single-use instant camera preloaded with a plurality of unconnected and unlinked (i.e., independent) pressure-processable film units. The single-use instant camera is capable of exposing and processing the independent films units, to produce finished photographic prints "on the spot". The camera itself functions as a package for the film units, and its construction is sufficiently simple and inexpensive so that the camera may be discarded when the film units, supplied therein, have been depleted. Particularly, the present invention provides a single-use instant camera having a predetermined number of preloaded independent pressure-processable film units and manually-operated means for advancing and processing said film units, after their imagewise exposure.

Referring to FIGS. 1 to 5, a preloaded single-use instant camera 10 of the present invention comprises a housing 12 defining a sealed light-tight enclosure. A user-inaccessible film holding compartment 14 is provided in said sealed light-tight enclosure and a predetermined number of unconnected pressure-processable film units 200, 202, and 204 are stacked therein. Also included as part of the single-use instant camera are an exit slot 80 (shown in FIG. 5) in the housing 12 of dimensions sufficient for the passage therethrough of one of the film units, an exposure system and means for initiating an exposure cycle to thereby expose the film unit at the foremost level 200 of said stack (see FIGS. 2 and 8), and a pair of axially rotatable pressure rollers 310 and 320 abutting at a nip.

As an important feature of the present invention, the single-use instant camera 10 is equipped with user operated manual processing means for urging the rotation of said pressure rollers 310 and 320 contemporaneously with the selecting and introducing of an independent film unit 200 at the foremost level of said stack into the nip between the pressure rollers 310 and 320. When the user operated manual processing means is driven by a user after exposure of the foremost film unit 200, the rotating pressure rollers 310 and 320 grab, then compress the film unit 200 (effecting its development), and in the process, withdraws film unit 200 from the user-inaccessible film holding compartment 14 and ultimately transports it out of the housing's enclosure through exit slot 80.

Several possibilities are contemplated for alternate configurations of the user operated manual processing means, configurations that still essentially allow a user to mechanically advance a pressure-processable film unit into and at least partially through the incorporated pressure applying means. Envisioned in this regard are embodiments having user-driven controls displaceable from a first position to a second position, wherein said displacement effects a direct, immediate, or correspondent translation of the user's mechanical input energy toward the mechanical advancement of said film unit.

For example, a slidable knob located on the outside of the housing can be firmly connected to a continuous belt wound inside said housing about or in immediate relation to one of the aforementioned pressure rollers and a wheel, gear, or another roller placed distant therefrom. Sliding or otherwise displacing said knob from a first position to a second position would result mechanically in the rotation of the continuous belt, and consequently, rotation of the pressure roller. A pick placed appropriately on such a continuous belt mechanism, the belt assembly positioned longitudinally abutting a stack of film units, can provide means for introducing one of said film units into the bite of the rotating pressure rollers.

While film advancement can be accomplished by such and like alternate configurations, in respect of efficacy, the function of film unit advancement is preferably accomplished by the use of a rigid or flexible withdrawable-insertable member 110. Thus, in one embodiment, the user operated manual processing means comprises a user withdrawable-insertable member 110, shown in FIG. 1 with an optional, but nonetheless useful, pull-ring 112.

As its name implies, the withdrawable-insertable member 110 is capable of being withdrawn and inserted into and out of the camera 10's housing 12, the withdrawal and insertion being at least partial, but not complete. In the particular embodiment depicted in FIG. 6, housing 12 is provided with a hole 114 having a size sufficient to permit said withdrawal and insertion. In operation, the withdrawable-insertable member 110 cooperates with at least one of said pressure rollers 310 and 320 such that the withdrawal of member 110 effects the rotation of said pressure rollers 310 and 320.

Figure 4:
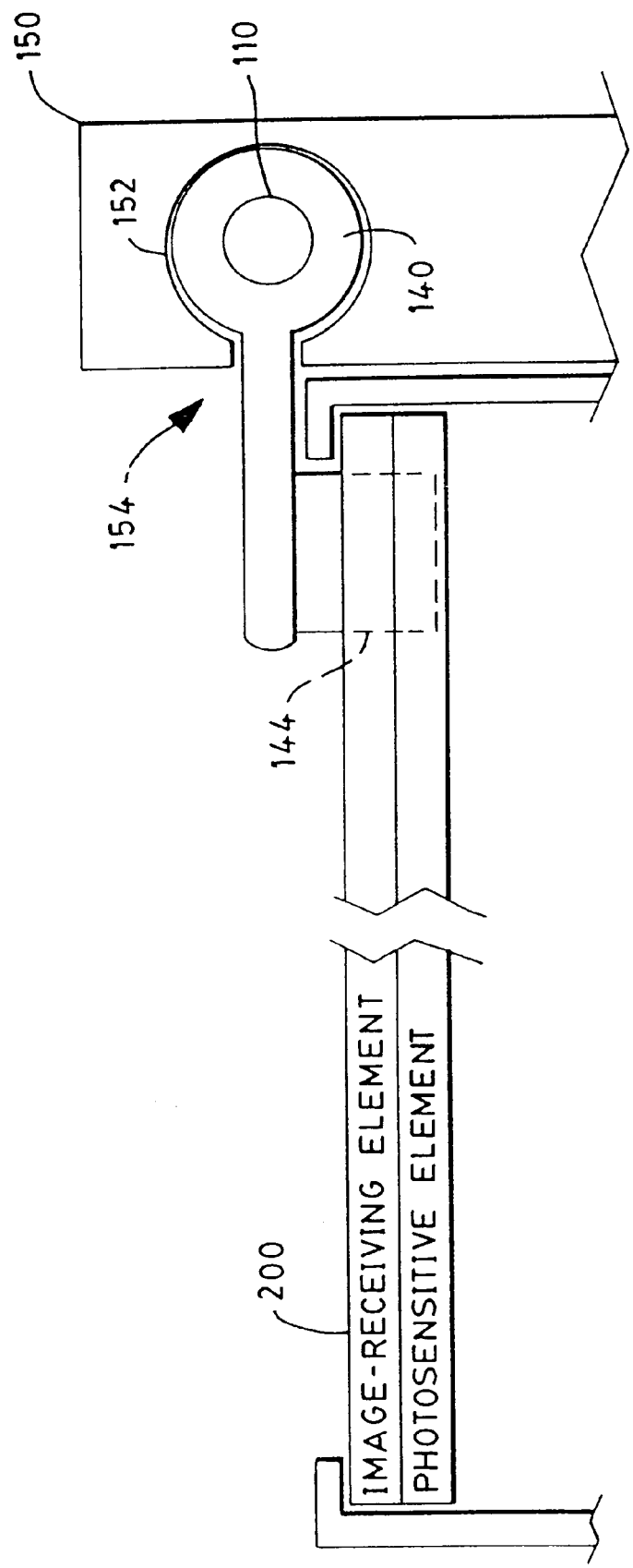
FIG. 4 is a rearwardly looking, partial cross-sectional view of the arrangement illustrated in FIG. 1, and showing in enlarged detail film pick 144 and its relation with uppermost film unit 200.
Figure 5:
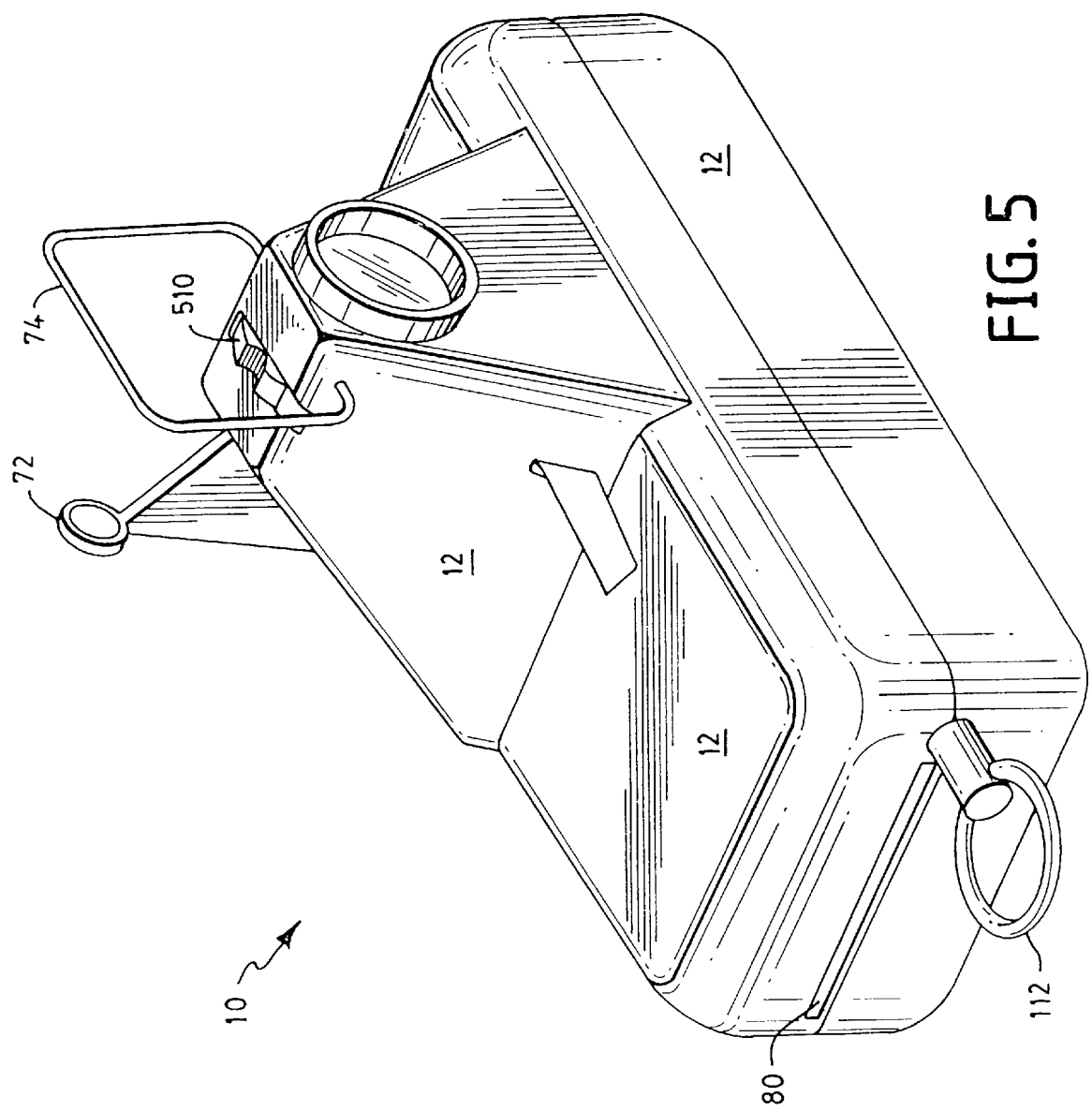
FIG. 5 is an exterior perspective view of a preloaded single-use instant camera according to an embodiment of the present invention.

Further, as shown in FIG. 1, the withdrawable-insertable member 110 is also provided with a force transmitting member 140 (hereinafter referred to as a "pick") designed for the selection and introduction of the aforementioned foremost film unit 200 into the nip between the rollers 310 and 320. As shown in FIGS. 1 and 4, pick catch 144 of pick 140 engages the trailing edge of the foremost film unit 200 and, when withdrawable-insertable member is driven by a user, moves the leading edge thereof into the bite of a pair of processing rollers 310 and 320. As shown in FIG. 1, pick 140 can be united with withdrawable-insertable member 110 by means of a ball 114 and socket 142 arrangement, as provided on member 100 and pick 140, respectively. Although this arrangement provides means for accommodating variations in the user's angle of withdrawal, it is envisioned that pick 140 can be an integral part of withdrawable-insertable member 110.

As another of its functions—as a results of its bulk and inability to fit through the components associated with pressure rollers 310 and 320—pick 140 prevents the complete withdrawal of member 100 out of the camera 10's housing 12.

Figure 8:
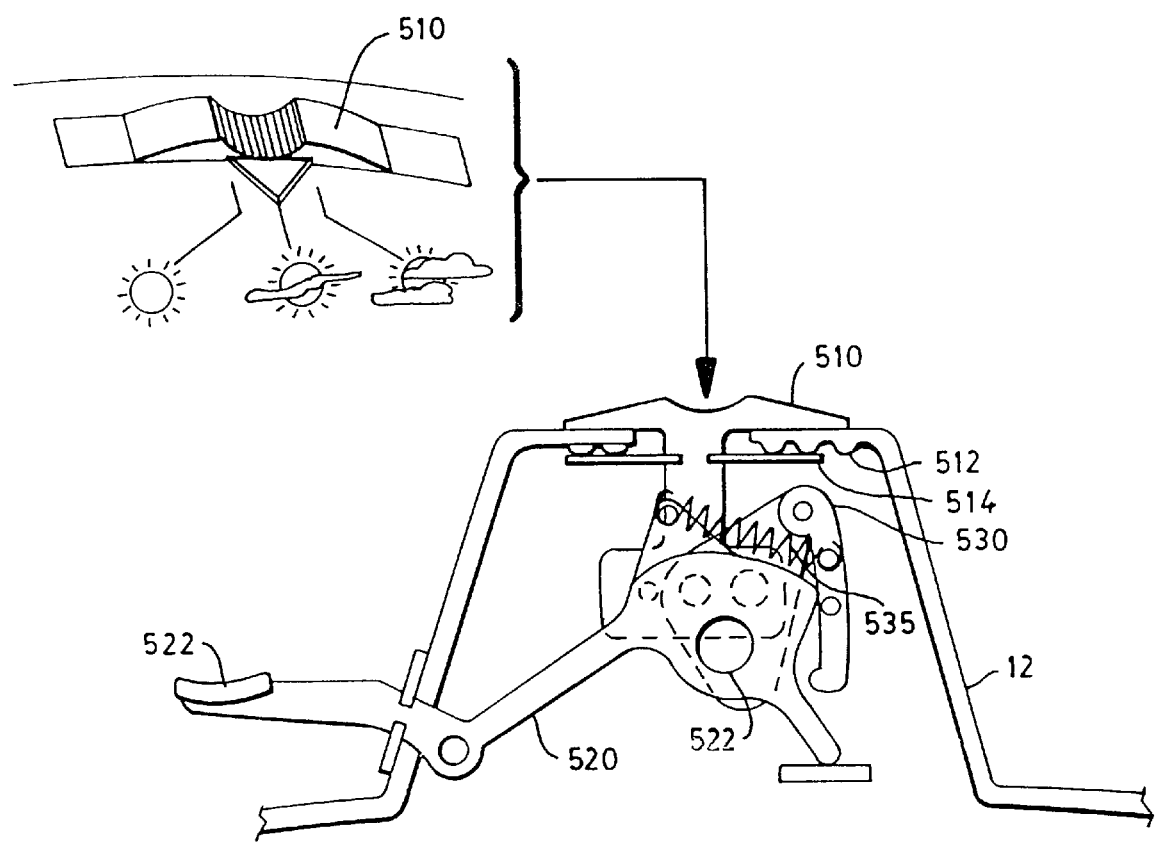
FIG. 8 is an enlarged view providing greater detail of the shutter and exposure mechanism of the preloaded single-use instant camera illustrated in FIG. 6.
Figure 9:
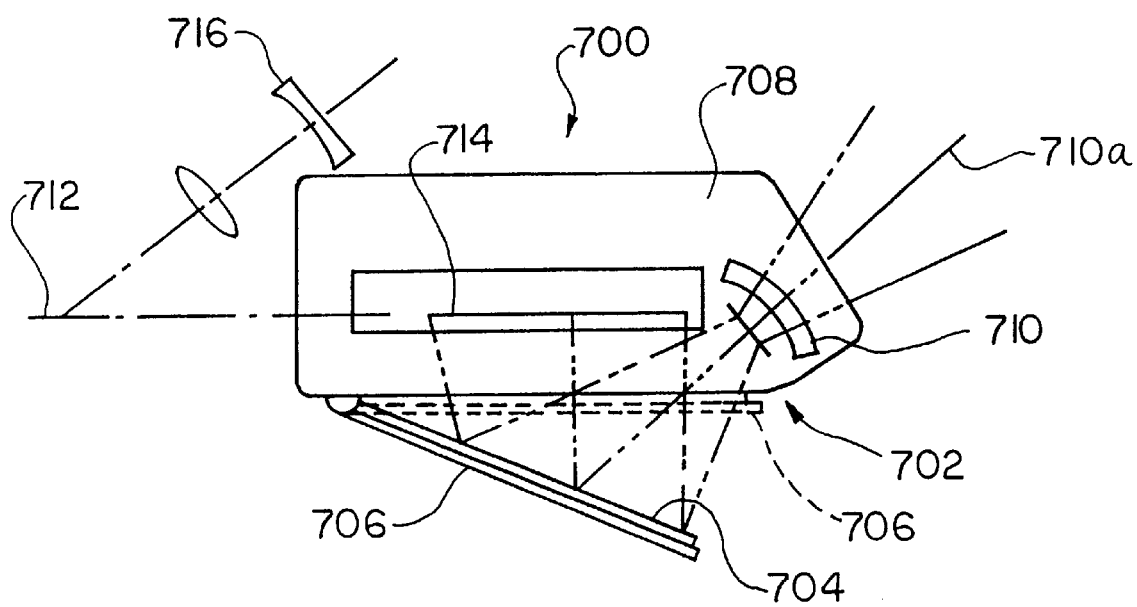
FIG. 9 is a view illustrating a camera of the instant type in which only the mirror is movable from a closed and folded condition or an erect or unfolded condition.
Figure 10:
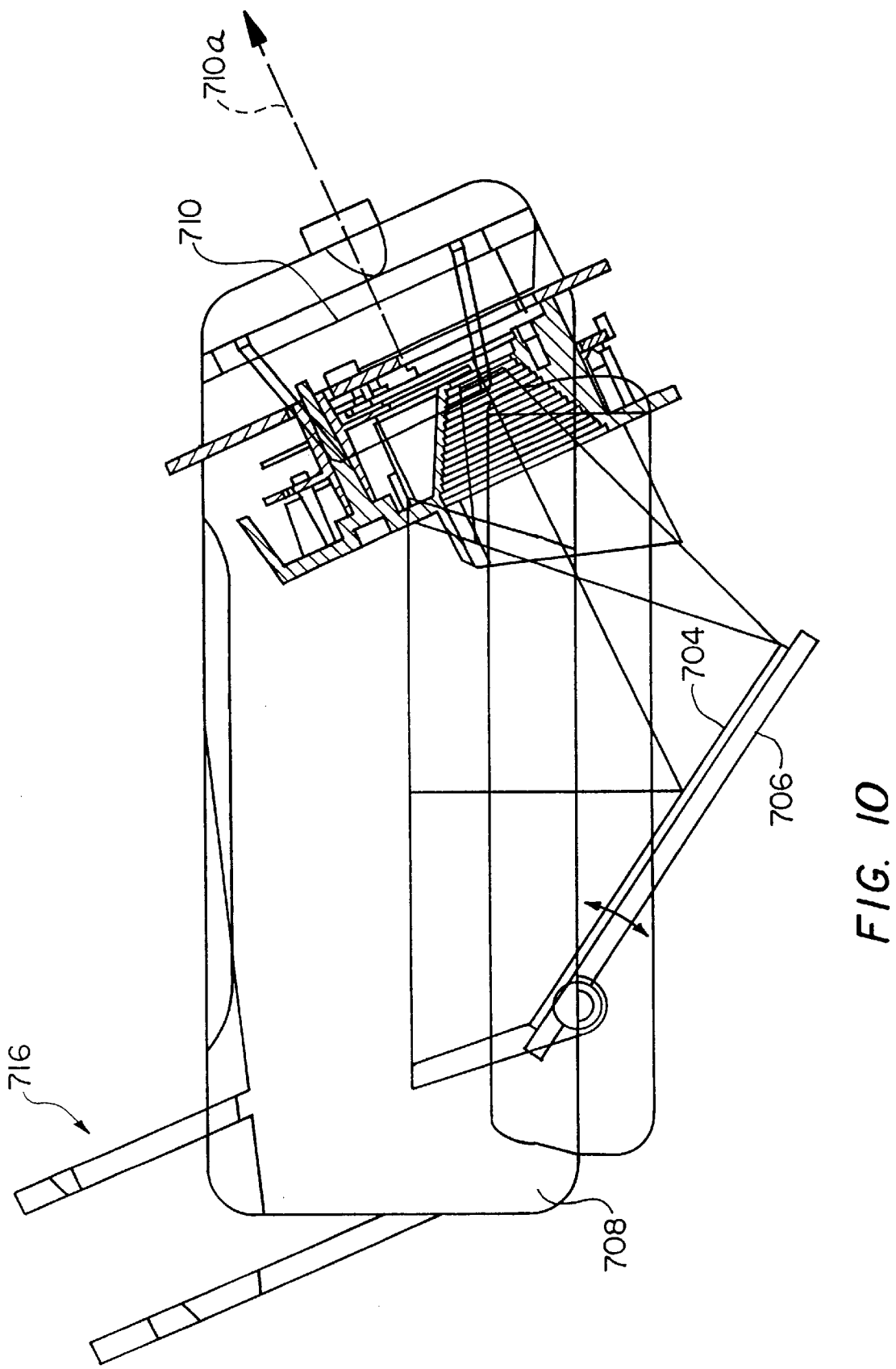
FIG. 10 is a side view of the camera shown in FIG. 9.
Figure 11:
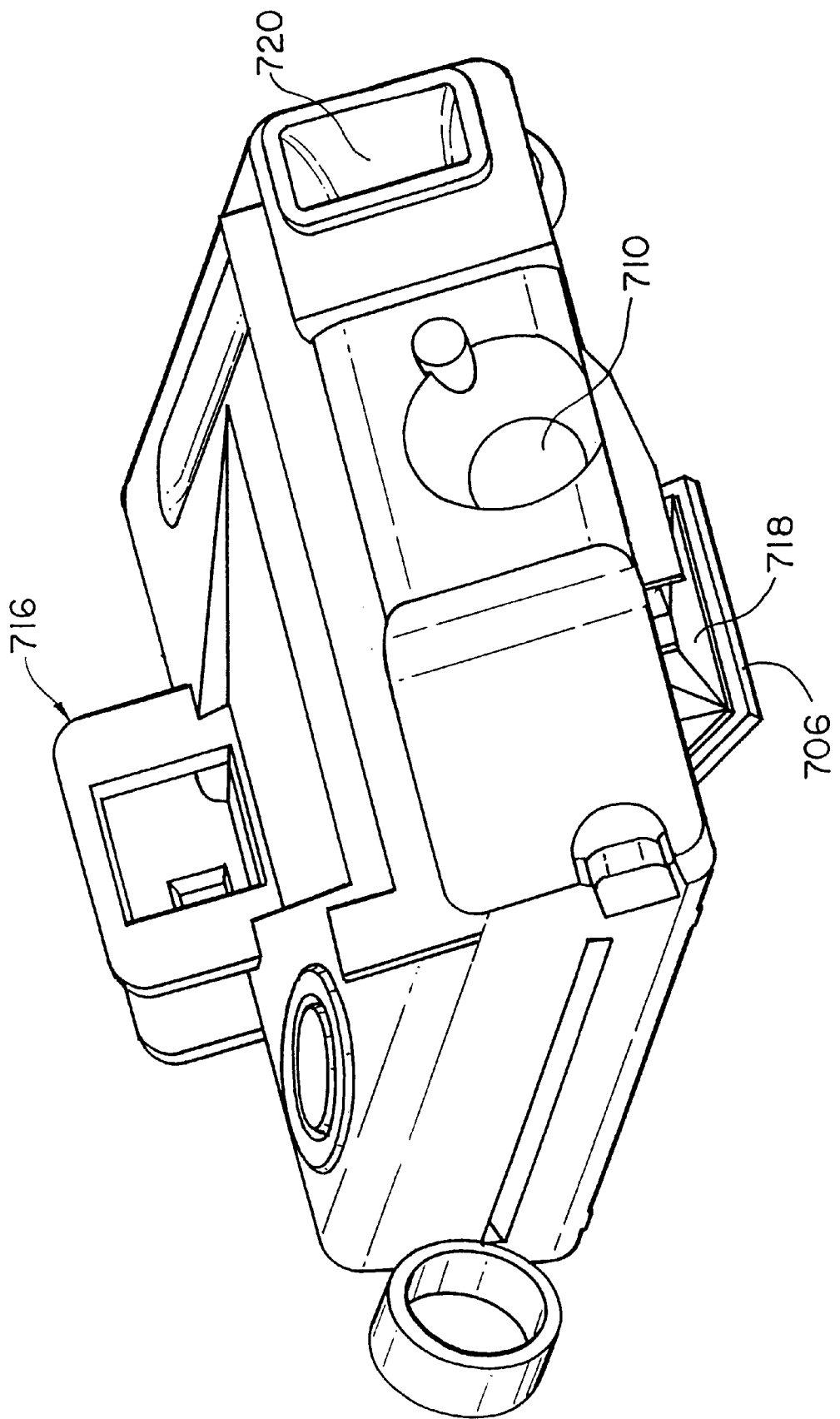
FIG. 11 is a perspective view illustrating the camera with the mirror assembly deployed from the bottom of the company.
Figure 12:
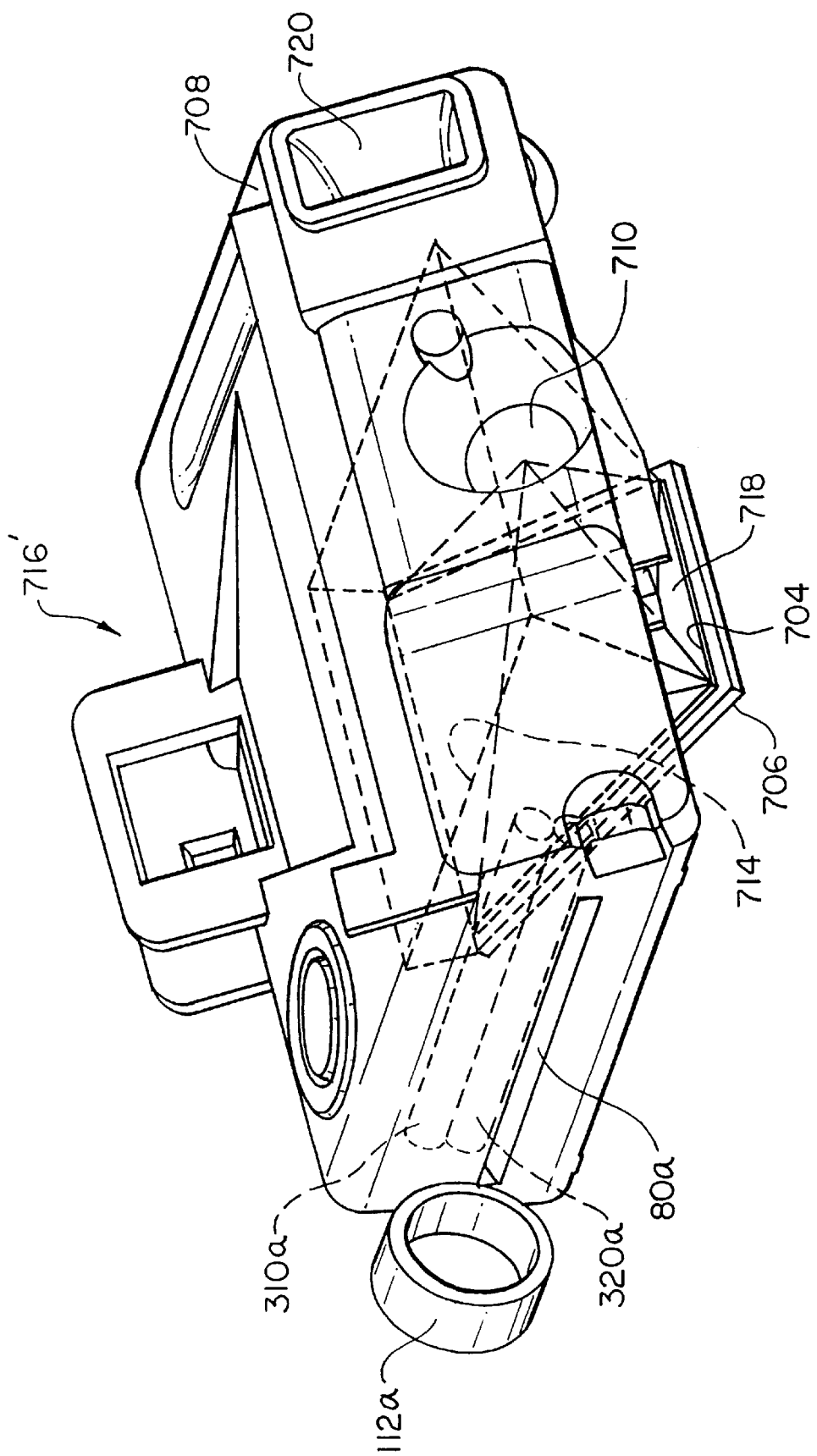
FIG. 12 is view of the camera in a mirror unfolded or erect condition.

As shown in the embodiment depicted in FIG. 8, a pick 140'can be designed to further include an arm 146 engageable with an exposure counter 246. In FIG. 8, exposure counter 246 is designed as a circular ratchet having on one side thereof sequential numerical indicia corresponding to the number of film units preloaded into the single use camera. When withdrawable-insertable member 110 is withdrawn, arm 246 engages with a tooth of the exposure counter 246, effecting rotation of counter 246. As a result, the numerical indicia viewable to the user through exposure viewing window 46 is updated. When withdrawable-insertable member 110 is reinserted back into the camera housing 12, the arm 146—although typically contacting exposure counter 246—will not cause the counter 26 to rotate, thus maintaining, for example, an accurate and reliably updated indication of exposures taken or remaining.

In the particular arrangement shown in FIG. 1, withdrawable-insertable member 110 effects film selection and roller rotation when pulled (i.e., withdrawn) out of housing 12. However, it is envisioned that in other arrangements of the user operated manual processing means, film selection and roller rotation can be accomplished by pushing (ie., inserting) a withdrawable-insertable member into a camera's housing. For example, it would be possible to unite at least one of a pair of pressure rollers with a gear train, the gear furthest away from the roller being of a ratchet-type assembly. The withdrawable-insertable member can be disposed relative to ratchet-type gear, such that when the member is withdrawn from a stored position within the housing, the ratchet-type gear will not rotate. But, when the withdrawable-insertable member is reinserted into the housing, the ratchet-type gear rotates, the rotation being translated to said pressure roller through said gear train. To effect film unit selection and introduction in to the nip for example, a hinged pick catch operable only upon insertion can be utilized.

While the particular user operated manual processing means disclosed herein are desirable incorporated into pre-loaded single-use instant camera, it is contemplated that such manual means can be used for or incorporated into virtually any apparatus designed for the output of imaged independent film units, wherein the film unit are of the type that are processed (cf., to effect development) by introduction into and compression by abutting or closely-spaced pressure-effecting members. Non-disposable self-developing camera come foremost to mind. In this regard, a camera incorporating the inventive component can be defined as follows: A camera comprising a housing providing a light-tight enclosure, a holding compartment in said light-tight enclosure capable of holding a stack of pressure-processable film units, said stack being either loose or in a cassette; an exit slot in said housing having dimensions sufficient for the passage therethrough of one of said film units; an exposure system and means for initiating an exposure cycle to thereby effect exposure of a film unit at the foremost level of said stack; pressure means within said enclosure for imparting pressure at a nip sufficient to influence the processing of a pressure-processable film unit advanced from said stack; and a withdrawable-insertable member capable of being at least partially withdrawn and inserted into and out of said housing by a user, and whereby the withdrawal or insertion of said member effects selection, introduction, and advancement of the film unit at the foremost level of said stack into and through said nip and at least partially out of said enclosure through said exit slot. As further examples, aside from cameras, the inventive user-operated manual processing means can also find utility as a component in apparatuses such as instant slide makers, photographic film printers, and photographic film duplicators.

In the unit shown in FIG. 1, pressure roller 320 is united with a coaxial pinion 130, and the user withdrawable-insertable member 110 has a length designed as a rack. In operation, the rack portion of said user withdrawable-insertable member 110 cooperates with (cf., meshes with) pinion 130 of roller 20 to thereby effect the rotation of pressure roller 320. And, as a result of the cooperating, enmeshed coaxial gears 325 and 315 provided respectively on pressure rollers 320 and 325, the rotation of pressure roller 320 effects the corresponding rotation of pressure roller 310. While cooperating end gears 315 and 325 are preferred, corresponding rotation can also be accomplished merely by friction (i.e., between the rollers, as well as between the passing film unit). Further, as shown in the embodiment depicted in FIG. 6, the ends of the spread rollers 310 and 320 can be journalled in a U-shaped bracket 330.

Each of the rollers 310 and 320 are typically cylindrical in nature, made of durable metal, and are typically a ¼" (0.64 cm) in diameter. In consideration of costs, however, rollers 310 and 320 can be made of a suitably rigid plastic materials. To accommodate for "bowing" expected in rollers made from certain plastic material, it is desirable that rollers 310 and 320 have a diameter greater than ¼" (0.64 cm), i.e., in the order of greater than ¼" (0.64 cm) to approximately ½" (1.25 cm). Additionally, for the processing of films units provided with a rupturable developer containing pod, rollers 310 and 320 —plastic or otherwise—having larger diameters can effectively increase the area of compression extant in the nip, and thus promote uniform spreading of a developer liberated from a ruptured pod. Other alternative configurations for rollers 310 and 320 can be found, for example, in U.S. Pat. No. 5,491,526, issued to Mitsuru Shimizu on Feb. 13, 1996, and U.S. Pat. No. 4,265,940, issued to Kenichi Kato on May 5, 1981.

Suitable means such as springs (not shown in FIG. 1, but see springs 317 and 327 in FIG. 6) are provided at each end of the roller 310 for resiliently biasing it toward the roller 320. Alternatively, means can comprise the combination of a bell crank and a tension spring, as discussed in U.S. Pat. No. 4,044,366, issued to Toshio Goto on Aug. 23, 1977.

As another important feature of the present invention, preloaded single-use instant camera 10, as schematically illustrated in FIG. 1, is provided with guide means 150 for guiding the transit of withdrawable-insertable member 110 when said member is withdrawn and inserted into and out of the camera housing 12 during use. In addition to guiding withdrawal and insertion, guide means 150 also functions to confine the angle at which member 110 is withdrawn and inserted by a user, thus promoting the uniformity of its operation. Several designs for the guide means 150 will be apparent to one skilled in the art in light of the present disclosure, each of which will tend to differ in the degree and extent to which angular confinement is accomplished. Suitable configurations for the guide means would include slides, slots, railings, tracks, channels, spaced-apart full or partial hoops, and the like. A particular design for guide means 150 (i.e., guide means 150') is shown in the particular embodiment depicted in FIG. 6.

In the schematic embodiment set forth in FIG. 1, guide means 150 comprises a slotted channel 152. It will be noted that the diameter of channel 152 is slightly larger than the diameter of pick joint 140, such that pick joint 140 can "ride" to and fro therein. While the "fit" between pick joint 140 and channel 152 can be designed so that withdrawal and insertion is relatively easy and unhindered, for certain embodiments, a snug friction fitting at the rearmost end of the guide 155—i.e., the end closest to the pick 140, when member 110 is fully inserted—is desirable. By such arrangement, when the withdrawable-insertable member 110 is withdrawn, the user must generate a force sufficient to overcome the frictional forces effected by the snug friction fitting. But, once the threshold is overcome, the user's applied forced at that moment will exceed the frictional forces at all points in the remaining length of channel 152, such that the user's momentum will drive withdrawable-insertable member 110 down channel 152 in—if all goes as one would expect—a fluid continuous motion. Fluid withdrawal of this nature will promote uniform rotation of pressure rollers 310 and 320, which in turn promotes uniform pressure processing.

To allow for the passage of the pick 140's catch 144, channel 152 is provided with a slot 154. As shown most clearly in FIG. 4, slot 54 can be designed such that it also functions to maintain the level of pick 140 extending arm, and thus maintaining the relationship of pick catch 144 with the foremost film unit 200. By confining the pick catch 144 to a set plane, the selection of a single film unit is ensured and made more reliable. The potential for withdrawing two film units, which can result in the jamming of pressure rollers 310 and 320, is also reduced.

A single-use instant camera 10 according to the present invention can be preloaded with any of the several varieties of imaging film units, the development of independent units thereof being effected by pressure processing, for example, to rupture a developer containing pod, or to crush photosensitive chromogenic microcapsules, or to effect intimate contact between layers of a photosensitive laminate. However, in the preferred embodiment, the single use instant camera is preloaded with presently available independent instant film units (with little or no structural modification), such as, Polaroid Captiva film, Polaroid Spectra HighDefinition film, and Polaroid Type 600 HighDefinition film, as well as, Fuji FI-10, FI-800, FI-800G, and FI-800GT integral print films, and Fuji FP-100 peel-apart print film. Film units described in the following patents can also be utilized: U.S. Pat. No. 3,415,644, issued to Edwin H. Land on Dec. 10, 1968; U.S. Pat. No. 3,594,165, issued to Howard G. Rogers on Jul. 20, 1971; U.S. Pat. No. 3,689,262, issued to Howard G. Rogers on Sep. 5, 1972; U.S. Pat. No. 3,647,437, issued to Edwin H. Land on Mar. 7, 1972; JP 111 663 A, issued to Fuji Photo Film KK on May 9, 1989; and U.S. Pat. No. 4,341,857, issued to Nanao Aoki on Jul. 27, 1982.

Typically, the preferred instant film units will comprise a photosensitive layer carried by a support sheet (ie., the photosensitive element noted in FIG. 4) and an image-receiving element (see FIG. 4). Each of the film units also includes a rupturable container of processing liquid at its leading end and a trap at its opposite end for receiving any excess processing liquid that may remain after it has been spread between the predetermined layers of the film unit.

As indicated above, the preloaded film units are "independent" (cf., "unconnected", "unlinked", etc.). As is known, instant film units can be designed connected to each other with "z-fold" type links, designed to permit continuous manual withdrawal of exposed instant film units from certain instant cameras. For example, upon withdrawal of a first film unit, a portion of the "z-fold" linkage follows, break outside the camera to form a tab or "leader" useful for withdrawing the succeeding film unit. While such configurations have served successfully as a basis for designing prior single-use instant cameras (see e.g., the aforementioned U.S. Pat. No. 5,103,249), in light of the particular reliability and cost objectives stated and/or implied herein, linkage becomes superfluous. Essentially, although possible, use of such "connected" film units is avoided by the provision of the manual film advancement and processing means described herein.

As indicated above, the pressure processable film units are stacked in a user-inaccessible film holding compartment 14. Certain advantages aligned with the objectives of the present invention are promoted by user-inaccessible film holding compartment. For example, because the holding compartment 14 is inaccessible to users, tampering and/or inadvertent removal, loss, or destruction of the film units preloaded therein by inexperienced users is avoided. Also, since the film units are stacked loose in the holding compartment 14, a film cassette—as is typical in the packaging of instant film for consumer use—is not required.

Figure 2:
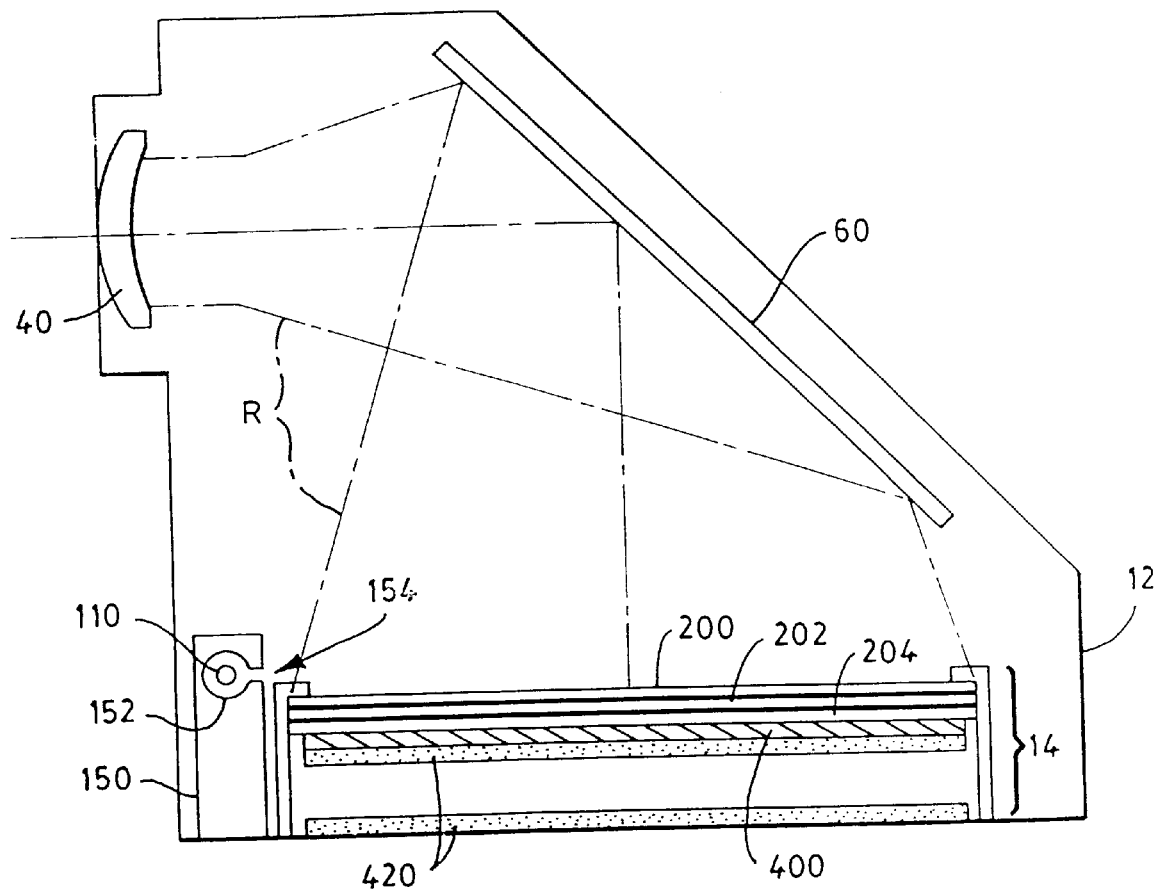
FIG. 2 is a cross-sectional view of the arrangement illustrated in FIG, 1 cut along section A—A, and placed in reference to preloaded single-use instant camera 10's housing 12 and its means for exposure (see lens 40 and reflector 60).
Figure 3:
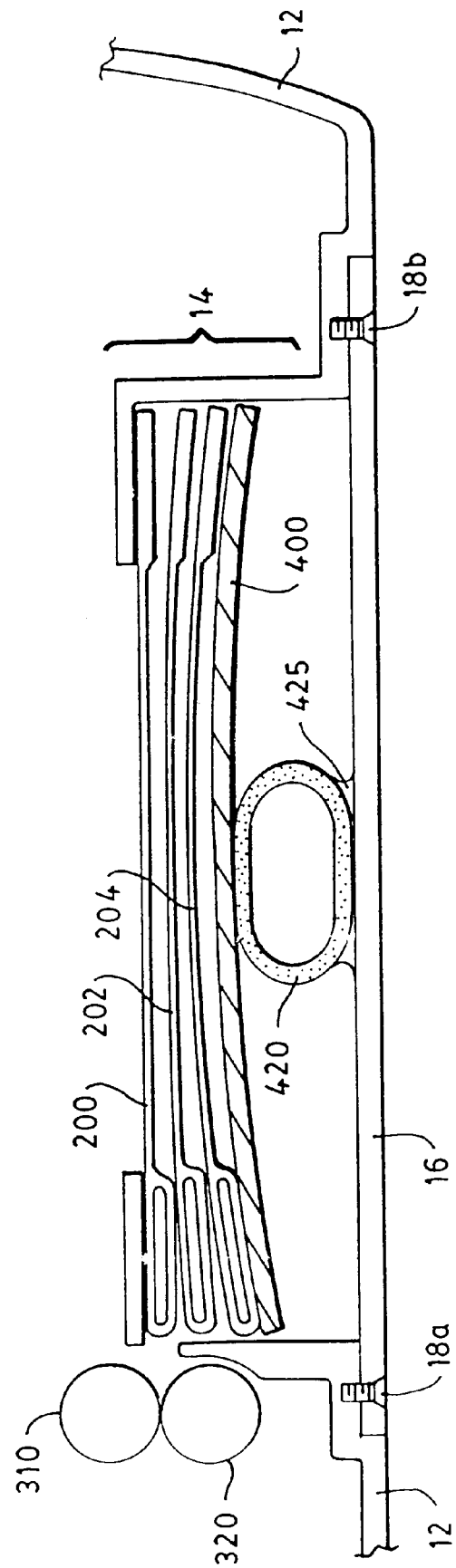
FIG. 3 is a cross-sectional view of the arrangement illustrated in FIG. 1, cut along section B—B, and placed in partial reference to preloaded single-use instant camera 10's housing 12 and in reference to its means for resiliently urging stacked film units toward an uppermost position where the top film unit is ready for exposure and simultaneous pressure processing and withdrawal.
Figure 7:
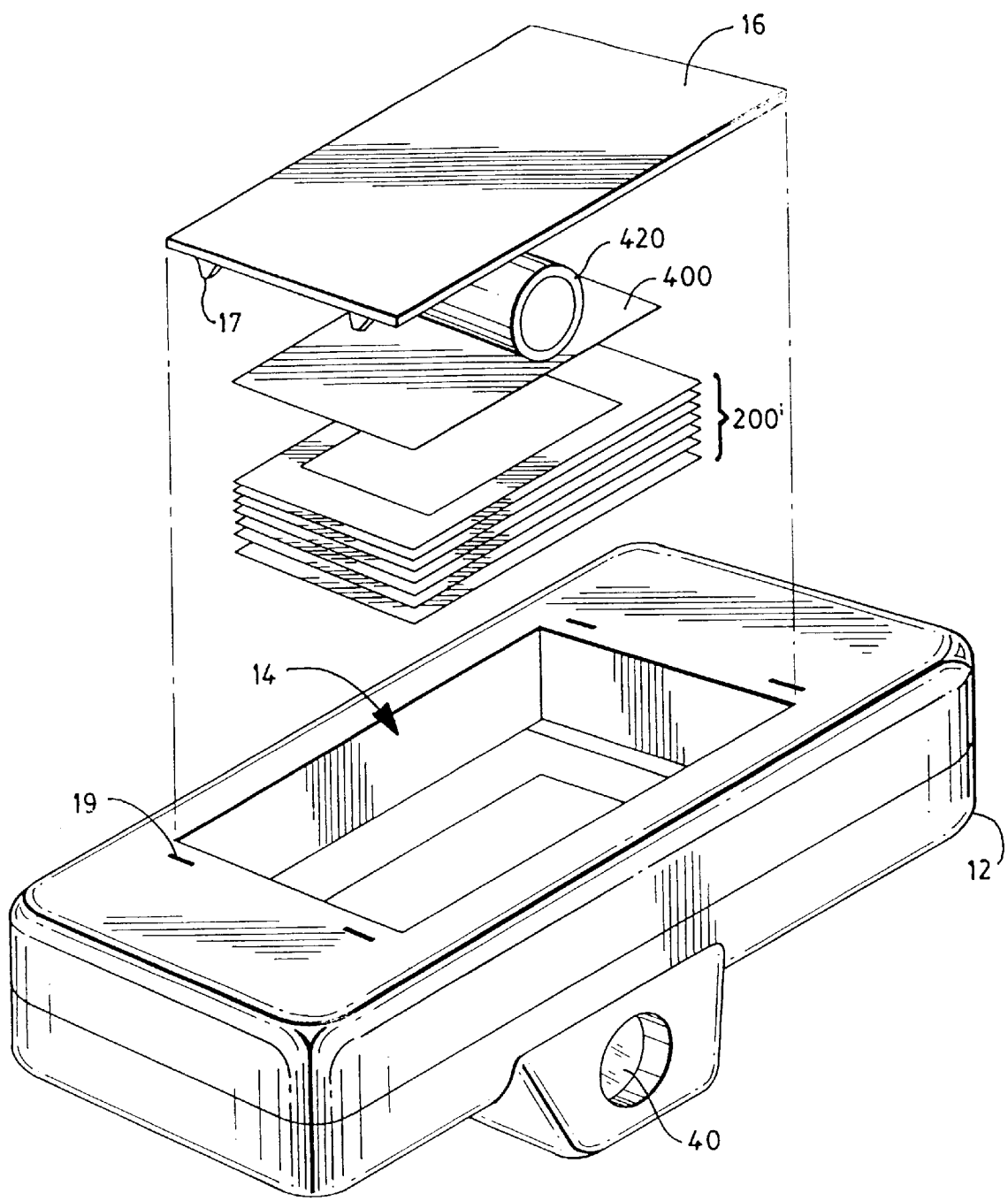
FIG. 7 is an exploded perspective view of the underside of the preloaded single-use instant camera illustrated in FIG. 6.

Regarding its design, the film holding compartment can simply be any user-inaccessible area of the camera dedicated to holding a stack of pressure processable film units. Preferably, however, as shown in FIGS. 2, 3 and 7, user-inaccessible film holding compartment 14 is designed as part of (or made part of) camera housing 12. For example, as shown in the particular embodiment depicted in FIG. 7, a stack of film units 200'is deposited in holding compartment 14, followed by pressure plate 400, and rubber tube spring 420. The compartment 14 is then closed with sealing plate 16. To effect user-inaccessibility, sealing plate 16 is provided with tabs 17 which are introduced into slots 19 provided in housing 12. As a more tamper-proof alternative to the slots 19 and tabs 17, one can use screws 18a and 18b, as shown in FIG. 3. In the same vein, the closing of compartment 14 with sealing plate 16 can also be accomplished by the use of adhesives or by welding.

While several alternatives are available for the sealing of compartment 14, the term "user-inaccessibility" (as used herein) should not be construed as requiring absolute inaccessibility. In fact, to encourage recyclability of a spent camera, a film holding compartment capable of being opened by the manufacturer would be desirable. Accordingly, the term "user-inaccessible" as used herein should be construed in consideration of the intent revealed by the units design. If the design suggests that the film holding compartment is intended not to be opened by the user in the normal operation and use of the camera, such would be sufficient to characterize the film holding compartment as "inaccessible". And clearly, if the preloaded single-use instant camera is rendered useless (ie., useless in consideration of the camera's primary intended function, as well as its expected lifetime) to an ordinary user by opening the holding compartment, then said holding compartment is "user-inaccessible".

The preloaded single-use instant camera is provided with resilient urging means within the user-inaccessible film holding compartment 14 for continuously and resiliently urging the stacked film units towards the foremost level of the holding compartment 14 (i.e., the level at which the foremost film unit 200 resides). To prevent "overshooting" beyond the foremost level, holding compartment 14 is designed or provided with structural restraining means for preventing the urging of the foremost film unit 200.

While there is much latitude for the design of such structural restraining means—such as, for example, inwardly projecting fingers, blocks, or ledges—structural restraining means should be designed and incorporated so that it will not interfere with the exposure of the foremost film unit 200, or interfere with the transit of the pick 140 when the withdrawable-insertable member 110 is operated. For example, as shown in the embodiment depicted in FIG. 6, this can be accomplished by designing the ceiling (see baffle 90) of holding compartment 14 as an open frame 141 having an central open area of dimensions at least identical to the extents of the desired image area of the preloaded film units, and having a notch 143 to accommodate the substantially unhindered passage therethrough of pick catch 144.

The resilient urging means can be a plate spring, for example, of the types found in commercially available POLAROID instant film cassettes, as well as instant film cassettes sold by the FUJI PHOTO FILM COMPANY. See also U.S. Pat. No. 4,823,155, issued to Hideaki Kataoka et aL on Apr. 18, 1989. Alternatively, the resilient urging means can comprise elastic bands drawing a rigid backboard toward a frame, compressively sandwiching film units therebetween, in the manner discussed in U.S. Pat. No. 3,898,680, issued to Yoshio Asano on Aug. 5, 1975. Despite the latitude available for its design, in the manner presently preferred—especially in consideration of cost—the resilient urging means (most clearly illustrated in FIG. 3) comprises an elastically deformable rubber spacer (e.g., rubber tube spring 420) and a rigid planar support 400 (e.g., a platform made of MYLAR). The planar support 400 will typically be positioned on the side of said stack opposite said foremost level. Accordingly, when the camera is assembled, the rubber spacer becomes resiliently compressed between the planar support and a wall (e.g., sealing plate 16) of the aforementioned film holding compartment 14 opposite the structural restraining means. To maintain the position, if desired, of rubber tube spring 420 centrally within film holding compartment 14, rubber tube spring 420 can be affixed to sealing plate 16 with an adhesive composition 425, as shown in the embodiment depicted in FIG. 3. Other means of fixation can be accomplished by the use of screws, tacks, single- or double-sided tape, brackets, "hook and loop" type fabrics (e.g., VELCRO), form fitting molded seats, and the like.

The preloaded single-use instant camera 10 when made available to the user (cf., when purchased) is ready for the photographic exposure of the uppermost film unit 200 contained in holding compartment 14. The subject of the exposure is viewed by a suitable viewfinder (see e.g., rear sight 72 and front framing sight 74 in FIG. 5) and, after being properly framed, an exposure cycle is commenced by the actuation of a shutter release button (see release button 522 in FIGS. 5, 7, and 8).

To expose the foremost film unit 200, preloaded single use instant camera 10 includes an exposure system and means for initiating an exposure cycle. Such systems and means are well known in the photographic art, see e.g., those discussed in U.S. Pat. Nos. 5,453,804; 5,103,249; 4,962,398; 4,518, 235; 4,090,211; 2,930,301; etc. In light of the vast number of such exposure systems and means, the present invention is not to be limited to any one in particular. However, in consideration of costs, disposability, simplicity, and potential recyclability, a presently preferred configuration is provided in FIGS. 2, 6, and 8.

As schematically shown in FIG. 2, on the front surface of the preloaded single-use instant camera 10 there is disposed an objective lens opening 41. An objective lens 40 is disposed adjacent lens opening 41 and is adapted to direct image-carrying light rays R to a reflective optical element 60 (e.g., a mirror) which reflects the light rays onto the plane (cf, the exposure plane) occupied by the foremost film unit 200. As illustrated by the details of the embodiment depicted in FIG. 6, reflective optical element 60 can be fixed onto a rear wall of camera housing 12 using adhesives together with a combination of retainers 60 and 64. Retainers can be made inexpensively from MYLAR-type plastics, or the like.

Figure 6:
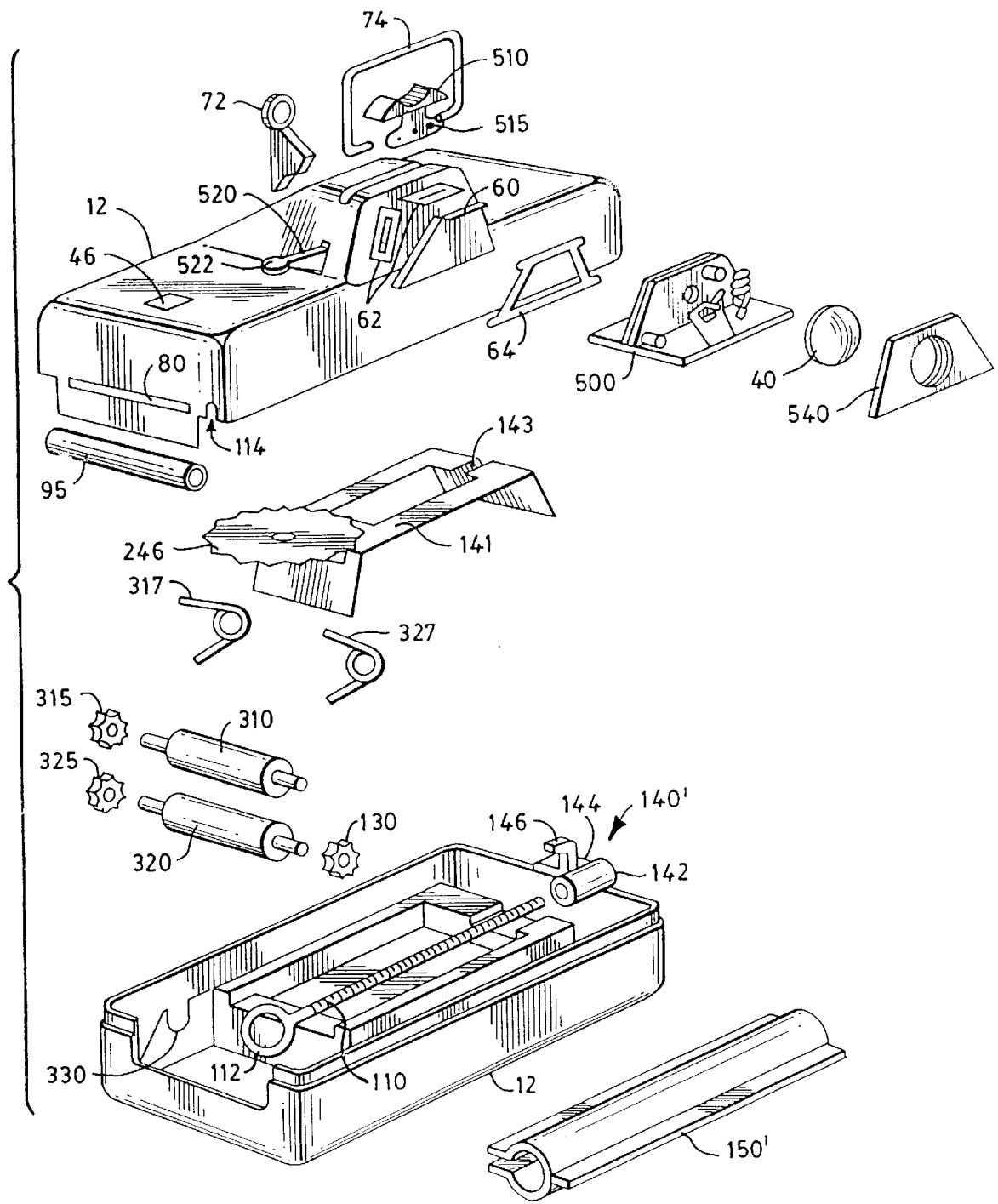
FIG. 6 is an exploded perspective view of a preloaded single-use instant camera according to a particular embodiment of the present invention.

As further and more particularly illustrated in the embodiment depicted in FIGS. 6 and 8, a preloaded single-use instant camera can include a lens 40 and shutter assembly (see components numbers in the 500 range) secured at the forward end of the camera housing 12. The shutter assembly, built on shutter housing 500 comprises a toggle switch 510, a shutter blade 530, and a shutter release arm 520. The toggle switch 510, having a sequence of apertures (three are shown in FIG. 8) provided in the internally extending portion thereof, can be toggled to and from predetermined exposure settings. "Stepped" toggling is effected by the use of a cooperating combination of catches 514 and detents 512. As shown in FIG. 8, a portion of the toggle switch 510 resides outside of camera housing 12. In the selection of a desired operative aperture, the exterior portion of the toggle switch 510 is manipulated by the user to a position pointing toward the corresponding setting indicated on the exterior of camera housing 12. As shown in FIG. 8, settings may be represented on the camera housing 12 by a series of iconographic indicia representative of the series of available apertures.

In effecting an exposure, shutter blade 530 (which is initially in a position covering the selected aperture) and shutter release arm 520 cooperate under the influence, in part, of a spring 535 and the release arm 520. Upon the user's actuation of the release button 522, the shutter blade is—in response to the bias of the spring 522—moved to uncover the selected aperture. At the same time, an orifice in shutter release arm 520 moves into alignment with the selected aperture, thereby allowing the passage of imaging light into the camera's housing 12.

FOLDING CAMERA

Reference is now made to FIGS. 9–12 for illustrating yet other embodiments of the present invention. Components of these embodiments which are similar to those of the first embodiment are designated by the same reference numeral with the addition of the suffix "a". These embodiments are directed generally to an improved folding camera 700 of the above self-developing type. Initial reference is made to the optical system 702 of the camera which includes a mirror 704 that is mounted on the inside of a door 706 which door is pivotally attached to the main body housing 708. The door 706 is movable from a locked and closed condition 706a to an open and unfolded condition 706b. The mirror 704, of course, directs scene light from the taking or object lens system 710 to a film plane 712 at which is present a film unit 714, preferably of the self-developing type. The object lens system 710 has its optical axis 710a arranged in the manner so that the light rays of the scene are directed to the mirror 704 when the latter is in the folded condition. Hence, both the object lens system 710 and the film units 714 are in the main body housing 708. A viewfinder 716 can be an optical type (FIG. 9) or can be a sport type viewfinder (FIGS. 10–12) wherein the latter may be pivotal. Whichever type viewfinder is used, however, it will have an orientation such that its axis is usable in combination with the object lens system 716. The sportfinder can be foldable if desired. A foldable and deployable bellows 718 is used in the normal manner to insure a light-tight passage of scene light from the taking optics 710 to the film unit 714 and accordingly is made of appropriate material. In one embodiment, the present invention contemplates that the bellows 718 can be made of paper-like material and if so desired can form part of the wrapping material usually associated with single-use cameras wherein the camera. It will also be noted that strobe system 720 is mounted on the front wall of the camera housing 708 and, therefore, does not move with the mirror. The film exit slot 80a allows ejection of the film in response to manual processing as noted above. The film exposure control and film transport and spread systems can be like that described in the above embodiment. The central focus of the present application is the configurations of the mirror. The foregoing construction advantageously allows for the provision of a simplified generally flat construction of a camera in which the folding system is enhanced.

In addition, the present embodiment of the invention contemplates having the mirror 704 deploying from the bottom of the camera 708. This is unique in contrast to other known systems wherein the folding optical system is erectable or deployable from the top or side of the camera housing. Additionally, because of the above construction, so-called "mirror Mylar" problems can be tolerated. Mirror Mylar is objectionable because it tends to fog the film in conventional self-developing cameras or even so-called compact conventional cameras. Mirror Mylar occurs when the same scene rays, generally bright sky rays, strike the film twice due to the geometry of the field of view with respect to the mirror and film plane in these conventional cameras. Such conventional cameras have the mirror above or lateral to the film at the film plane. However, with the taking lens at the bottom of the camera in generally horizontal image capture mode as in the present embodiment and the film plane above the mirror, the rays which were troubling because of the tendency to strike the film twice, now come from the bottom of the scene. Typically such rays would be less bright and thus less noticeable when striking the film for the second time. Because mirror Mylar is less of a problem, there is somewhat greater latitude in orienting making the mirror more compact than would otherwise be the case in event the mirror was at the top of the camera.

Although not shown, the present invention contemplates having the mirror in a fixed relationship with respect to the camera and thus it need not be foldable. Further, the present invention contemplates having the folding mirror deploy from the top or even the side of the camera.

What is claimed is:

1. A self-developing camera comprising: a housing assembly including a film exit opening; an objective lens assembly defining an optical axis and for optically directing scene images to a focal plane; a mirror for redirecting scene light from the objective lens assembly to a film unit of the self-developing type adjacent the focal plane, the mirror being in an operative orientation generally below the optical axis when the camera is held in a generally horizontal image capture mode, wherein the housing assembly includes a movable wall and the mirror is connected thereto, the movable wall and mirror are mounted for movement about a pivotal axis between an inoperative folded orientation and the operative orientation which is erect, whereat in the operative orientation the mirror redirects scene light from the objective lens assembly to a film unit.

2. The camera of claim 1 wherein the film exit opening is at a location generally above the mirror when the mirror is in the operative orientation.

3. The camera of claim 1 wherein the objective lens assembly and a film unit are housed within the housing assembly, and the movable wall along with the mirror are movable between the inoperative and operative orientations.

4. The camera of claim 1 further including a viewfinder which is mounted on the housing assembly above the mirror when the latter is in the operative orientation.

5. The camera of claim 2 wherein the exit opening is oriented such that the film unit emerges from the housing assembly along a path that is generally perpendicular to the optical axis.

6. A preloaded self-developing camera comprising: a housing assembly including a film exit opening; an objective lens assembly defining an optical axis mounted for optically directing scene images to a focal plane; at least a pre-loaded film unit of the self-developing type located adjacent the focal plane; a mirror for redirecting scene light from the objective lens assembly to the film unit, so that the mirror is in an operative orientation generally below the optical axis when the camera is held in a generally horizontal image capture mode, wherein the housing assembly includes a movable wall and the mirror is connected thereto, the movable wall and mirror are mounted for movement between an inoperative orientation and the operative orientation.

7. The camera of claim 6 wherein the film exit opening is at a location generally above the mirror when the mirror is in the operative orientation; the objective lens assembly and film unit are housed within the housing assembly, and the movable wall along with the mirror are movable between the inoperative and operative orientations.

8. The camera of claim 6 wherein the exit opening is oriented such that the film unit emerges from the housing assembly along a path that is generally perpendicular to the optical axis.

9. A self-developing camera comprising: housing means for housing an objective lens assembly and a film exit opening, the lens assembly defining an optical axis for optically capturing images of a scene; a film plane at which a film unit of the self-developing type can be located; light redirecting means in the housing means for redirecting scene light from the objective lens assembly to a film unit, such that the light redirecting means is in an operative orientation generally below the optical axis when the camera is held in a generally horizontal image capture mode, wherein the housing means includes a movable wall and the mirror is connected thereto, the movable wall and mirror are mounted for movement between an inoperative orientation and the operative orientation, whereat in the operative orientation the mirror redirects scene light from the objective lens assembly to the film unit.

10. The camera of claim 9 wherein the film exit opening is at a location generally above the mirror when the mirror is in the operative orientation.

11. The camera of claim 9 wherein the film exit opening defines an exit path for the film which is generally perpendicular to the optical axis.

* * * * *